Aug. 12, 1958 L. A. KOLKER 2,847,484
PREPARATION OF METHYL CHLORIDE
Filed March 1, 1957
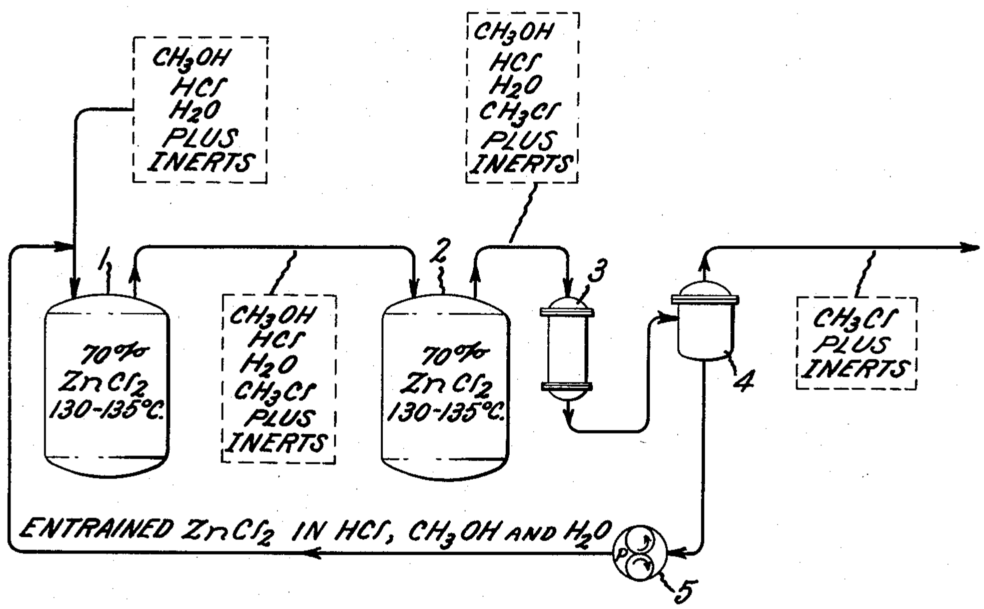
Inventor:
Leon A. Kolker,
by [signature]
His Attorney.

United States Patent Office 2,847,484

Patented Aug. 12, 1958

2,847,484

PREPARATION OF METHYL CHLORIDE

Leon A. Kolker, Larchmont, N. Y.

Application March 1, 1957, Serial No. 643,334

3 Claims. (Cl. 260—657)

This invention is concerned with a method for preparing methyl chloride from the reaction of dilute aqueous HCl solutions and methanol. More particularly, the invention is concerned with a continuous process for obtaining increased yields of methyl chloride from the reaction of aqueous HCl and methanol contained in a mixture having present therein substantial quantities of methyl chloride (at least 50 percent by weight of the total weight of the HCl and methanol), which process comprises introducing, preferably under pressure, a feed mixture comprising methyl chloride, methanol, and an aqueous HCl solution of from 5 to 35 weight percent concentration, into an aqueous zinc chloride solution of from 65 to 75 percent weight concentration, while recycling unreacted methanol and HCl containing entrained zinc chloride back to the zinc chloride solution so as to maintain the concentration of this zinc chloride at a substantially constant concentration level.

In the preparation of methylene chloride and chloroform by the chlorination of methyl chloride, there are obtained reaction mixtures which contain substantial quantities of methyl chloride and HCl. Since methyl chloride is commercially important, it is often desired to convert the formed HCl to additional yields of methyl chloride by reacting methanol with the hydrogen chloride in the reaction product without removing the methyl chloride from the reaction product. Thus, in the reaction between methyl chloride and chlorine, there is obtained a reaction mixture which contains HCl, methyl chloride, methylene chloride, and trichloromethane (or chloroform). In order to give versatility to the process in the type of products obtained, it is desirable that one be able to continue on with the reaction product, without separating it into its components, to form greater yields of methyl chloride, taking advantage of the fact that hydrogen chloride is present in the reaction mixture. The chloromethanes of higher chlorination than methyl chloride are inert and therefore can be passed along with the methyl chloride and the HCl for subsequent reaction with, for instance, methanol, to obtain additional quantities of methyl chloride, in addition to the previously formed methyl chloride. At the end of this latter reaction, it is possible to fractionate the HCl-methanol reaction mixture to obtain the various chlorinated methanes, including methyl chloride, methylene chloride, and chloroform.

In another reaction, such as the hydrolysis of organochlorosilanes, employing water for reaction with the organochlorosilanes to form organopolysiloxanes, there is obtained a reaction product which includes dilute aqueous solutions of HCl. This dilute aqueous solution of HCl, which may be in concentrations ranging from about 5 to 35 percent on a weight basis, is separated from the organopolysiloxane formed. The aqueous HCl thus isolated can then be reacted with methanol to give methyl chloride, which can be employed in making methylchlorosilanes by reaction with silicon, preferably in the presence of a catalyst such as copper, in the manner disclosed and claimed in Rochow Patent 2,380,995. However, it has been found that the reaction of dilute aqueous HCl solutions with methanol, although giving about 50 to 65 percent yields of methyl chloride, based on the HCl, nevertheless such yields are not sufficiently good to make this process for making methyl chloride commercially feasible. Accordingly, in commercial practice it has become necessary to treat the aqueous HCl so that the HCl is rendered substantially anhydrous, and in this anhydrous form the HCl can be reacted with methanol in the gaseous state to give good yields of methyl chloride in the order of about 90 to 95 percent yield. Conversion of the aqueous HCl to the anhydrous state is expensive and time-consuming, and adds to the cost, not only of the HCl, but also to any products made therefrom such as methyl chloride.

When using anhydrous HCl in the reaction with methanol to make methyl chloride, employing a catalyst, such as zinc chloride, the rate of feed of the combination of the anhydrous HCl and methanol is relatively low and usually is of the order of less than about 0.004 mole feed of anhydrous HCl and methanol per pound of zinc chloride per hour. Stated alternatively, it has been found that one can at best employ about 0.5 mole feed per mole $ZnCl_2$, which is quite low. In addition, elevated temperatures of about 150° C. or higher must be employed in order to achieve optimum conversion (even under these conditions) of the reactants to the desired methyl chloride.

In accordance with the present invention, highly efficient conversion of aqueous solutions of hydrogen chloride to methyl chloride with substantially complete reaction and negligible loss to by-products is accomplished by a two-step process involving successive reaction of methanol and aqueous HCl. The aqueous solution of hydrogen chloride (hereinafter referred to as "HCl solution") and methanol, in combination with a feed mixture containing substantial quantities of methyl chloride, are introduced into an aqueous zinc chloride solution maintained at a concentration of about 65 to 75 percent, by weight, zinc chloride, employing a temperature of from about 115° to 145° C., preferably from 120° to 140° C. The feed composed of the aqueous HCl solution and the methanol is first introduced into the zinc chloride solution, preferably, although not essentially, maintained at an elevated pressure, e. g., at a pressure of from 3 to 50 pounds per square inch, or even higher pressures, and in such a manner that the feed is introduced into the zinc chloride aqueous solution preferably at several points in order to effect adequate dispersion of the feed. Higher pressures are conducive to higher capacities of the reaction chamber. The heat of the zinc chloride solution, which is at a temperature of about 115° to 145° C., volatilizes the various reactants, including any unreacted HCl and methanol, thus giving an overhead volatile mixture containing (1) the original methyl chloride which was present prior to introduction into the zinc chloride solution, (2) additional yields of methyl chloride over that originally present, and (3) water. Improved volatilation can be obtained by applying a vacuum to the overhead reaction products after passage through the zinc chloride solution.

After this passage of the methanol and aqueous HCl, together with any inert materials which may be present, through the first aqueous zinc chloride solution described above, the volatile products are then led into a second zinc chloride solution of the same weight concentration, maintained at the same temperature and introduced in the same manner as was done in connection with the introduction of the aqueous HCl and methanol into the first zinc chloride solution. As a result of this two-step passage of the methanol and aqueous HCl, unexpectedly high yields of methyl chloride are obtained resulting in maximum utilization of the incoming methanol and HCl.

For optimum utilization of my process, it is essential that the volatile products containing the reaction product of methanol and HCl, which is obtained after passage through the second (which may be the final) zinc chloride solution, should be condensed so as to separate the unreacted methanol and HCl, and to recycle these latter two ingredients back into the first zinc chloride solution. This results in two advantages. The methanol and HCl become available again for interaction to make additional quantities of methyl chloride. In addition, what is equally as important is the fact that the volatile products issuing from the zinc chloride solution contain entrained therein varying amounts of the zinc chloride. Unless this entrained zinc chloride is returned to the zinc chloride solution, insufficient zinc chloride will ultimately be available for catalytic purposes to effect the desired degree of conversion of the incoming methanol and HCl feed to methyl chloride. The recycle of the methanol and HCl furnishes the medium for returning the zinc chloride to both the zinc chloride solutions thus maintaining the zinc chloride solution in both reaction chambers at essentially a constant concentration.

It was entirely unexpected and in no way could have been predicted that, once having attained a certain level of methyl chloride content in the reaction mixture as a result of the first passage through the zinc chloride solution that the introduction into the second aqueous zinc chloride solution, of this methyl chloride feed together with methanol and dilute aqueous HCl would still further increase the yield of methyl chloride and would allow the reaction between the HCl and the methanol to form additional large quantities of methyl chloride. It would have been expected that little, if any, further yield of methyl chloride could be obtained due to the equilibrium relationship between the methyl chloride and the HCl and methanol, as illustrated by the formula $$CH_3OH+HCl \rightleftharpoons CH_3Cl+H_2O$$

It would have been more logical to predict that additional formation of methyl chloride would have been suppressed by the presence of the large quantities of methyl chloride and water already present in the feed mixture.

However, it was unexpectedly found that the use of a zinc chloride catalyst solution of a specific concentration and the use of pressure concurrently with dispersion of the feed containing inerts (e. g., methyl chloride, methylene chloride, chloroform, etc., which promote the necessary degree of agitation and high throughout) into the zinc chloride solution, and maintaining a temperature of from 115 to 145° C., the yield of methyl chloride increased to almost a quantitative yield depending on the molar concentrations of the HCl in the aqueous HCl solution and the methanol introduced into the zinc chloride solution. Instead of repressing further formation of methyl chloride, the inert materials including the first formed methyl chloride serve to promote additional formation of methyl chloride from methanol and HCl contrary to what might be expected in equilibrium relationships.

The important aspect of my invention is directed to the second passage through the zinc chloride solution of the $CH_3Cl$-containing mixture of aqueous HCl and methanol to obtain the unexpectedly increased and high yields of methyl chloride.

A satisfactory procedure for continuous formation of methyl chloride comprises introducing the feed containing the methyl chloride, aqueous HCl, and methanol, into a closed reactor capable of being subjected to pressure. Heat is introduced into the zinc chloride solution, for instance, by means of a steam jacket around the reaction vessel, or by means of heated coils strategically placed inside and in intimate contact with the zinc chloride solution. Simultaneous with the introduction of the feed, water vapor, methyl chloride, as well as unreacted methanol and HCl, together with any inert materials, such as chlorinated methanes, which may have initially been present in the feed, are withdrawn at such a rate as to minimize changes in concentration of the zinc chloride catalyst solution. By recycling unreacted HCl and methanol containing entrained zinc chloride, to the zinc chloride solution, the zinc chloride solution remains substantially constant in composition and in catalytic effectiveness for prolonged lengths of time. The methyl chloride is readily recovered by conventional condensing and scrubbing techniques.

The molar ratio of methyl alcohol and HCl introduced into the zinc chloride solution is advantageously within the range of from about 0.8 to 1.3 moles methanol per mole HCl, and preferably from 1 to 1.3 moles methanol per mole HCl. In arriving at the desired molar concentration of these two ingredients, designed to give increased yields of methyl chloride, consideration should be given to the temperature at which reaction will be effected between the HCl and methanol, which temperature will be that present in the zinc chloride solution, the pressure, etc. Under many conditions of reaction, I have found that optimum conditions include temperatures of about 120° to 140° C., zinc chloride concentrations of about 70 to 72 percent, and an hourly feed rate of about 0.04 mole feed per pound zinc chloride, or alternatively 5.5 moles feed per mole zinc chloride. Obviously somewhat lower or higher feed rates may be employed without departing from the scope of the invention. Consideration should also be given to the concentration of the other ingredients in the feed, including whether there is a very dilute or more concentrated HCl aqueous solution, the concentration of methyl chloride which may be present, as well as the concentration of other ingredients which may be present, such as other chloromethanes.

In order that those skilled in the art may understand how the present invention may be practiced, the following examples are given by way of illustration and not by way of limitation. All parts and percentages are by weight, unless otherwise specified.

*Example 1*

An aqueous zinc chloride solution of about 70 percent concentration, by weight, was placed in a glass-lined autoclave and heated to a temperature of about 130–135° C. A feed composed of about 960 parts HCl in 1,000 parts water, 2195 parts methyl chloride, 959 parts methylene chloride, and 406 parts trichloromethane (all except the water having been obtained from the reaction of methyl chloride and chlorine) was mixed with 646 parts methyl alcohol. This mixture of ingredients, herein referred to as "feed mixture," was then introduced into the above-identified reactor containing the zinc chloride aqueous solution under a pressure of about 8 lb./sq. in. The gaseous reaction products (including 2856 parts methyl chloride, 482 parts HCl, 1,237 parts water, 959 parts methylene chloride, 406 parts chloroform, and 227 parts methanol) were withdrawn from the vapor space above the zinc chloride solution as they were formed. The evolved vapors which contained the same previous amounts of methylene chloride and chloroform now contained an increased amount of methyl chloride, but still not the optimum yield of methyl chloride. There was thus obtained from this initial conversion, in addition to the original quantity of 2195 parts methyl chloride, an additional 661 parts methyl chloride which represents about a 65 percent conversion of the methanol in the feed mixture (based on a use of 1.3 moles HCl per mole methanol).

The mixture of ingredients obtained in this latter reaction was then passed (this being done on a continuous basis) into another zinc chloride aqueous solution of the same concentration and maintained at the same temperature as the first zinc chloride solution, maintaining a pressure again of about 8 lb./sq. in. This latter feed containing about 482 parts HCl in 1237 parts water (making an HCl concentration of about 28 percent) was introduced under pressure of about 8 p. s. i. through a dip leg positioned at the bottom of the second zinc chloride solution reactor and containing a plurality of openings designed to disperse the feed in the zinc chloride solution. The evolved vapors were again removed from the pressure reactor, and were found to be of the following composition: 3064 parts methyl chloride, 332 parts HCl, 1310 parts water, 96 parts methanol, together with the originally present 959 parts methylene chloride and 406 parts trichloromethane. Based on the original methyl alcohol and HCl introduced, and excepting from consideration the HCl and methanol recycled to return the entrained $ZnCl_2$, there was over a 95 percent conversion of the $CH_3OH$ to methyl chloride. The reaction product was partially condensed and unreacted methanol and HCl obtained, plus entrained zinc chloride, were recycled back into the first zinc chloride solution to maintain the concentration of the latter and of the second zinc chloride solution at a constant level. In the above example, the rate of feed of the mixture of ingredients comprising the methyl chloride, methylene chloride, chloroform, HCl and methanol was of the order of about 5.5 moles of the feed per mole of zinc chloride present in the second zinc chloride solution tank.

It will thus be seen from this example that, whereas the first reaction between the aqueous HCl and methanol gave only about a 65 percent conversion of methyl chloride, and despite the presence of large amounts of methyl chloride which might be expected to depress further formation of methyl chloride, the introduction of the methyl chloride feed containing the dilute aqueous HCl into the second zinc chloride solution chamber gave marked improvement in yields of methyl chloride so that over a 95 percent ultimate yield of methyl chloride was obtained.

*Example 2*

Aqueous HCl (368 parts HCl in 2480 parts water resulting from the hydrolysis of methylchlorosilanes with water) was mixed with 250 parts methanol in a ratio of about 1.3 moles HCl per mole methanol, and the vapors of this mixture were introduced into a reactor containing 70 percent, by weight, zinc chloride solution maintained at a temperature of about 130–135° C., similarly as was done in the first reaction described in Example 1. The evolved vapors (which contained 257 parts $CH_3Cl$, 2573 parts $H_2O$, 86 parts $CH_3OH$, and 182 parts HCl) were found to contain methyl chloride representing a conversion of about 65 percent of the methyl alcohol to methyl chloride. This mixture of ingredients was fed into a second zinc chloride solution of the same concentration and temperature as in the first zinc chloride solution in the manner described above in Example 1. This second reaction of the methyl alcohol and aqueous HCl effected an additional conversion of the methanol and aqueous HCl to methyl chloride and, based on the methanol originally introduced but excepting the methanol and HCl recycled to the first zinc chloride solution to return entrained zinc chloride, it was found that a conversion of about 94 percent methyl chloride could be realized despite the fact that the injection of the feed into the second zinc chloride solution was accompanied by the presence of large quantities of methyl chloride and water. The feed rate during this continuous production of $CH_3Cl$ was about 5.3 moles feed mixture per mole $ZnCl_2$.

The accompanying drawing shows the steps employed in the practice of my invention. The initial feed comprising for instance, the methyl chloride, HCl, and water plus any inert materials which have been obtained by previous processing, for instance, methylene chloride, chloroform, etc., are introduced into the reaction chamber 1 containing a 70% zinc chloride aqueous solution maintained at a temperature of 130–135° C. The reaction products are withdrawn from the top of the reaction chamber 1 and are then led in accordance with the main embodiment of my invention into a second reaction chamber 2, containing a similar 70% aqueous zinc chloride solution maintained at the same temperature, 130–135° C. The reaction products this time containing the ultimate yield of methyl chloride, are then removed from the top of the reaction chamber 2 and led into a condenser 3 from which are led the reaction products and inerts to a separation chamber 4. From one point of the separation chamber, are removed the final yield of methyl chloride as well as any inert materials which may have been present originally and which were used throughout the process for imparting the necessary agitation in each of the zinc chloride solution chambers. From another part of the separation chamber 4, is led a mixture of ingredients comprising zinc chloride entrained in a mixture of relatively small amounts of HCl, methanol, and water; by means of a pump 5 the entrained zinc chloride is then recycled to the first zinc chloride chamber 1 to make available on a continuing basis a constant concentration of zinc chloride in both the reaction chambers 1 and 2.

The specificity of the zinc chloride as compared to other metallic halides used for this reaction is shown by the fact that when ferric chloride was substituted for zinc chloride in Example 2 under similar conditions of reaction, in the first pass through the ferric chloride solution, there was a conversion of only about 38 to 43 percent of the methanol to methyl chloride. It will be found that the subsequent introduction of the reaction products, including methyl chloride and unreacted HCl and methanol, together with the water, will give much lower ultimate conversion than will be obtained if a concentrated zinc chloride aqueous solution is used employing the conditions recited above.

It will, of course, be apparent to those skilled in the art that other temperatures of reaction, proportions of methanol and HCl as well as concentrations of HCl, and concentrations of zinc chloride solution may be employed within the ranges previously recited without departing from the scope of the invention.

The rate of passage of the feed of methanol and HCl as well as any other inert materials of the type mentioned previously may be varied; advantageously such variation of rate of throughput of the feed is within the range of from 0.02 to about 0.10 mole of the ingredients comprising the feed per pound of zinc chloride per hour, or stated alternatively from about 4 to 10 moles of the feed per mole of zinc chloride per hour.

The methyl chloride obtained in the above-described reaction can be reacted with silicon to give additional supplies of methylchlorosilanes which can, in turn, be hydrolyzed to make methylpolysiloxane resins, lubricating fluids, rubbers, etc., which have good resistance to heat and, in the case of rubbers, maintain their flexibility at temperatures as low as about −100° C. The formed methyl chloride can also be chlorinated to make additional quantities of methylene chloride and chloroform.

What I claim as new and desire to secure by Letters Patent of the United States is:

1. A continuous process for making methyl chloride which comprises (1) introducing methanol and aqueous HCl of from 5 to 35 percent weight concentration into an aqueous zinc chloride solution, (2) removing the formed volatile materials comprising methyl chloride which is present in an amount equal to at least 50%, by weight, of the total weight of the HCl and methanol, and unreacted HCl and methanol, (3) introducing the volatile mixture of ingredients described in (2) into another aqueous zinc chloride solution, (4) removing the volatile products thereby obtained comprising an increased yield of methyl chloride over that obtained in step (1), (5) recycling a mixture of HCl, methanol and water obtained from the volatile materials of step (4) and containing entrained zinc chloride to the first zinc chloride solution, each aqueous zinc chloride solution having a weight concentration of from 65–75% and the temperature of each zinc chloride solution being within the range of from about 115–145° C., the rate of throughput of the feed comprising the methanol and aqueous HCl being within the range of from 4 to 10 mols of the feed per mol of zinc chloride in each zinc chloride solution per hour, and (6) recovering the formed methyl chloride.

2. A continuous process as in claim 1 in which the methanol and aqueous HCl introduced into the first zinc chloride solution have admixed therewith methyl chloride, methylene chloride, and chloroform derived from the chlorination of methyl chloride.

3. A continuous process as in claim 1 in which the reactions described therein are conducted under a pressure of at least 3 lbs./sq. in. gauge.

References Cited in the file of this patent

UNITED STATES PATENTS

| | | |
|---|---|---|
| 1,824,951 | Frei | Sept. 29, 1931 |
| 2,026,131 | Klein et al. | Dec. 31, 1935 |
| 2,308,170 | Green et al. | Jan. 12, 1943 |
| 2,394,291 | Calcott et al. | Feb. 5, 1946 |
| 2,396,639 | Carter | Mar. 19, 1946 |
| 2,622,107 | Mattson | Dec. 16, 1952 |